United States Patent [19]
Reynolds

[11] Patent Number: 6,099,260
[45] Date of Patent: Aug. 8, 2000

[54] PUMP TRAP ASSEMBLY HAVING MULTIPLE PIVOT AXES

[75] Inventor: Charles M. Reynolds, Three Rivers, Mich.

[73] Assignee: Armstrong International, Inc., Three Rivers, Mich.

[21] Appl. No.: 09/098,775

[22] Filed: Jun. 17, 1998

[51] Int. Cl.[7] .................................. F04F 1/06; F04F 3/00
[52] U.S. Cl. ............................................ 417/133; 417/126
[58] Field of Search .................................... 417/133, 118, 417/126, 130, 131

[56] References Cited

U.S. PATENT DOCUMENTS

| Re. 34,957 | 5/1995 | Francart, Jr. . | |
|---|---|---|---|
| 1,175,685 | 3/1916 | Brand | 251/75 |
| 1,314,244 | 8/1919 | Brand | 251/75 |
| 2,172,110 | 9/1939 | Sabin | 417/133 |
| 5,230,361 | 7/1993 | Carr et al. . | |
| 5,426,990 | 6/1995 | Francart, Jr. | 74/100.1 |
| 5,655,888 | 8/1997 | Yumoto . | |
| 5,755,560 | 5/1998 | Yumoto . | |
| 5,865,603 | 2/1999 | Francart, Jr. | 417/133 |

*Primary Examiner*—Teresa Walberg
*Assistant Examiner*—Thor S. Campbell
*Attorney, Agent, or Firm*—MacMillan, Sobanski & Todd, LLC

[57] ABSTRACT

A pump trap assembly with multiple pivot axes. The pump trap assembly includes a mounting bracket for mounting the trap assembly to a structure. A first pivot arm having a length is pivotally mounted to the mounting bracket about a first pivot axis. A second pivot arm having a length is also pivotally mounted to the mounting bracket about the first pivot axis. A spring is used to bias the first and second pivot arms toward each other. A float arm having a length is also pivotally mounted to the mounting bracket about a second pivot axis. The second pivot axis is a distance from the first pivot axis. An actuator is pivotally mounted to the second pivot arm about a third pivot axis. The third pivot axis may be the same as the second pivot axis or may be a distance from the first and second pivot axes. Movement of the float arm in a first direction causes the spring to urge the second pivot arm in the first direction and move the actuator in the first direction. In another embodiment, the second pivot arm may be pivotally mounted to the mounting bracket about a different pivot axis than the first pivot arm. In another embodiment, the float arm may be pivotally mounted to the same pivot axis as the second pivot arm. The pump trap having multiple pivot axes provides for a more compact design than conventional pump traps having only one pivot axis for both the float arm and the pivot arms.

31 Claims, 7 Drawing Sheets

PUMP TRAP ASSEMBLY HAVING MULTIPLE PIVOT AXES

BACKGROUND OF THE INVENTION

This invention relates in general to a pump trap assembly for liquid pumping systems, and in particular, to a pump trap assembly having multiple pivot axes for decreasing the travel distance needed for the float arm to actuate the valve mechanism.

Pump trap assemblies with valve actuating mechanisms are useful in controlling the filling of a closed or sealed pressure vessel. For example, in U.S. Pat. No. Re 34,957 to Francart, Jr., the pressure vessel includes a vent valve for venting the interior of the vessel to the surrounding atmosphere and a second pressure valve subjected to high pressure inlet fluid. During filling of the pressure vessel, the vent valve is in the open position and the pressure valve is closed by a single-float operated over-center valve actuating mechanism. As the vessel fills with fluid, the float rises and a rotatable float arm, forming part of the valve actuating mechanism, is swung or rotated about a pivot point at one end, causing an over-center toggle linkage mechanism to move toward the center position against a spring bias. Such a mechanism has toggle linkage elements which snap quickly through the center position, closing the vent valve while simultaneously snap opening the high pressure inlet valve to pump the accumulated liquid from the vessel. Typically a tension or compression coil spring provides such a biasing force with one end of the coil spring coupled to a fixed or stationary member of the valve mechanism or vessel. In other cases, such tension coil spring is coupled at opposite ends to moveable elements of the valve actuating mechanism.

While such over-center snap-acting valve mechanism for steam condensate pumps and fuel feeding systems operate satisfactory to automatically control the liquid feed to and discharge from the pressure vessel, such known mechanisms are complex and expensive. Further, conventional pump trap assemblies are designed such that the float ramn and the linkage mechanism pivot about the same axis. As a result, the pump trap assembly requires that the float arm move a relatively large amount of travel distance to cause the linkage mechanism to snap through the center position, thereby increasing the overall size of the pump trap assembly.

It is, therefore, an object of the invention to provide a pump trap assembly that decreases the travel distance necessary for the float arm to cause the linkage mechanism to snap through the center position to close the vent valve and open the inlet valve.

It is another object of the invention to provide a pump trap assembly that can be positioned in locations that require a relatively small amount of clearance as compared to a conventional pump trap assembly.

It is yet another object of the invention to provide a pump trap assembly that includes a plurality of pivot axes for decreasing the travel distance necessary for the float arm to cause the linkage mechanism to snap through the center position.

It is still another object of the invention to provide a pump trap assembly that does not require adjustments of the float arm and spring arms.

SUMMARY OF THE INVENTION

To achieve these and other objects, this invention relates to a pump trap assembly having multiple pivot axes. The pump trap assembly includes a mounting bracket for mounting the pump trap assembly to a structure. A first pivot arm is pivotally mounted to the mounting bracket about a first pivot axis. A second pivot arm is pivotally mounted to the mounting bracket about the first pivot axis. A spring is connected to the first and second pivot arms for biasing the first and second pivot arms toward each other. A float arm is pivotally mounted to the mounting bracket about a second pivot axis, the second pivot axis being a distance from the first pivot axis. An actuator is pivotally mounted to the second pivot arm about a third pivot axis, the third pivot axis being a distance from the first pivot axis. Movement of the float arm from a first position to a second position causes the first pivot arm to move in a first direction. Movement of the first pivot arm in the first direction a predetermined distance causes the spring to urge the second pivot arm in the first direction, thereby moving the actuator in the first direction.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
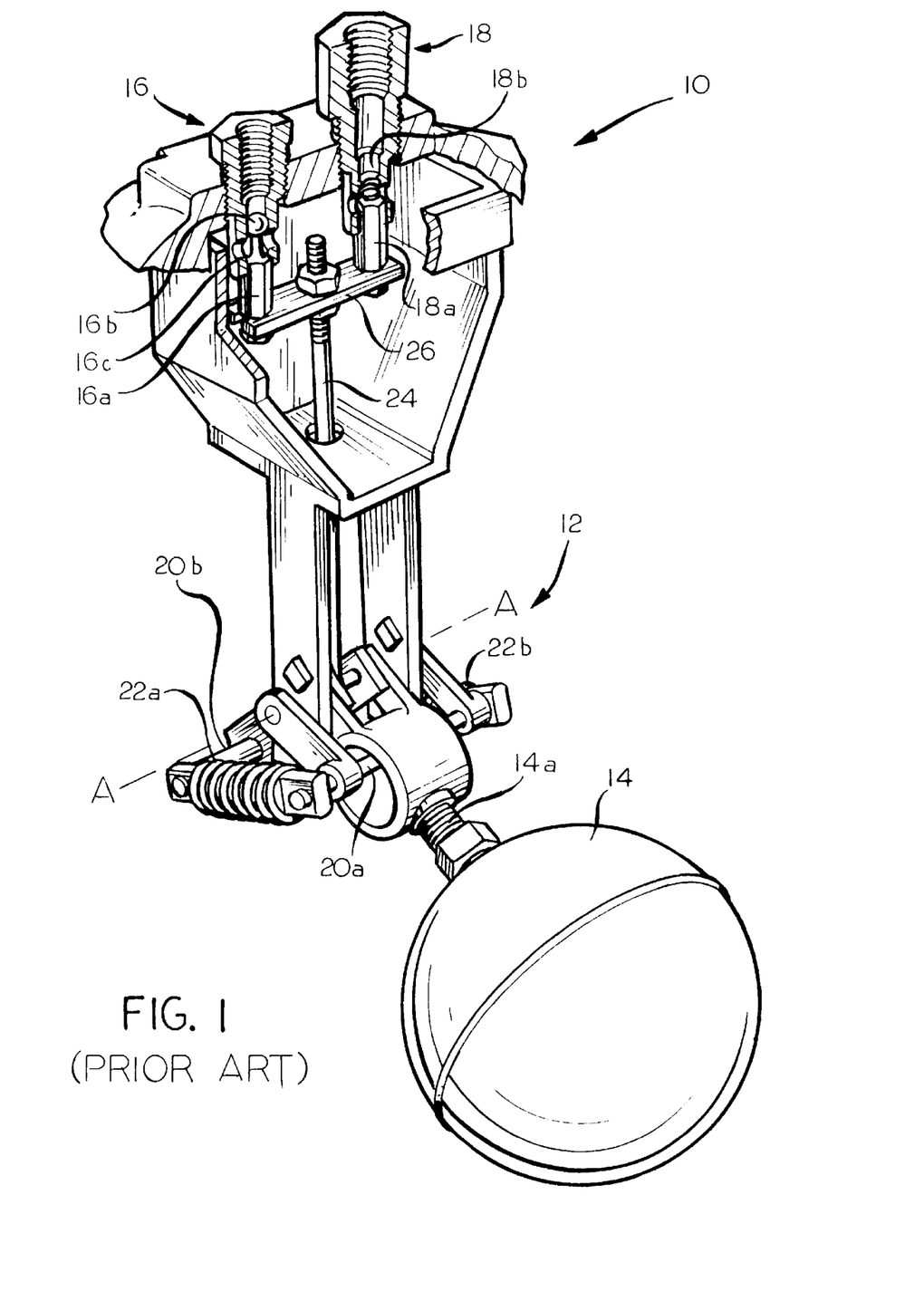
FIG. 1 is a perspective view of a conventional pump trap assembly.

Referring now to the drawings, there is illustrated in FIG. 1 a conventional pump trap assembly, shown generally at 10. Typically, the pump trap assembly 10 includes a over-center toggle linkage valve actuating mechanism, shown generally at 12, that is actuated by a float 14 to change the state of a steam (or other high pressure gas) normally closed, gas inlet valve 16, and a pressure vessel chamber, normally open, gas exhaust or vent valve 18. In the normal or down position, the float 14 is at its lowest position, as shown in FIG. 1, with the gas (steam) inlet valve 16 closed and the chamber gas exhaust or vent valve 18 open.

The pump trap assembly 10 is typically mounted inside a pressure vessel (not shown). When liquid flows by gravity into the pressure vessel, the float 14 will become buoyant and rise. As the float 14 continues to rise, it rotates about a pivot axis (denoted by the line A—A in FIG. 1) and the float arm 14a engages one of the toggle links or pivot arms 20a, 20b of the valve actuating mechanism 12, increasing the tension of the dual coil springs 22a, 22b. When the float 14 has risen to its upper tripping point, the energy stored in the tension springs 22a, 22bby expansion is released instantly, causing both sets of toggle links 20a, 20b to snap upwards, over center, relative to a center line between the pivot coupling of the links 20a, 20b at ends opposite to the common pivot axis (denoted by the line A—A in FIG. 1) between the links 20a, 20b. The amount of upward movement of the float 14 from its lowest position to the upper tripping point is called the "upward travel distance" of the float 14. It should be noted that the float 14 and the toggle links 20a, 20b rotate about the same pivot axis in the conventional pumping trap assembly 10.

When the links 20a, 20b snap over the link in-line position, they move into oppositely upward oblique positions which, in turn, cause a valve push rod or actuator rod 24, operatively coupled thereto, to simultaneously open the gas pressure (steam) inlet valve 16 and to close the vent valve 18. In effecting that action, a plate 26 coupled to the upper end of the valve push rod 24, raises a vertical pin 16a, thereby driving an inlet ball 16b off of an annular seat 16c of the gas pressure inlet valve 16. The plate 26 is also engaged with the lower end of a movable valve member or pin 18a of the gas vent valve 18 which is driven upwardly into sealing engagement with a seat 18b of the gas vent valve 18 to close off the gas exhaust outlet. Steam (or other high pressure gas) flows through the inlet valve 16 and develops a pressure within the pressure vessel (not shown) of sufficient magnitude to pump the accumulated liquid from the vessel through an outlet opening (not shown).

As the liquid level in the pressure vessel decreases, the float 14 drops. Before the float 14 reaches its lowest position, the float arm 14a engages the link 20a of the valve actuating mechanism 12, increasing the tension in the tension coil springs 22a, 22b. When the float 14 drops to its lower tripping point, the energy stored by the expansion of the coil springs 22a, 22b is released instantaneously, causing the toggle links 20a, 20b to snap over center in downwardly oblique, opposite directions. The amount of downward movement of the float 14 from its highest position to the lower tripping point is called the "downward travel distance" of the float 14. The downward movement of the toggle link 20b rapidly drops the push rod 24. This acts to open the closed vent valve 18 by driving the moving valve member 18a of the vent valve 18 downwardly off the seat 18b and driving the steam inlet valve pin 16a downwardly until the separate steam inlet valve ball 16b seats on the valve seat 16c. The steam inlet valve ball 16b is maintained sealed thereon by the high pressure steam within the operating pressure inlet valve 16. Liquid again flowing by gravity or otherwise into the pressure vessel (not shown) tends to fill the pressure vessel, and the cycle is repeated.

Figures 2, 3:
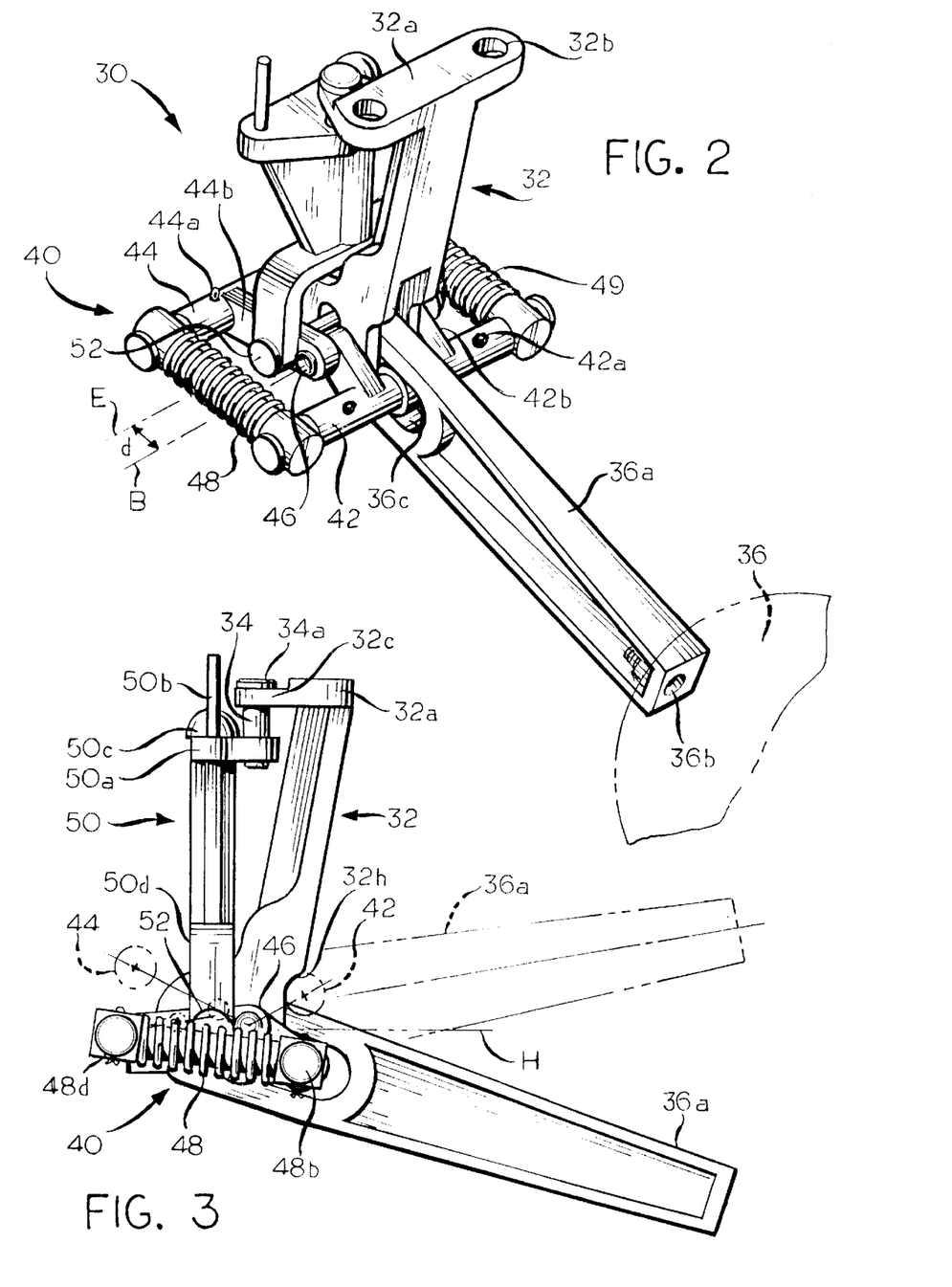
FIG. 2 is a perspective view of the pump trap assembly in a down position according to a first preferred embodiment of the invention.
FIG. 3 is a side elevational view of the pump trap assembly of FIG. 2.
Figure 6:
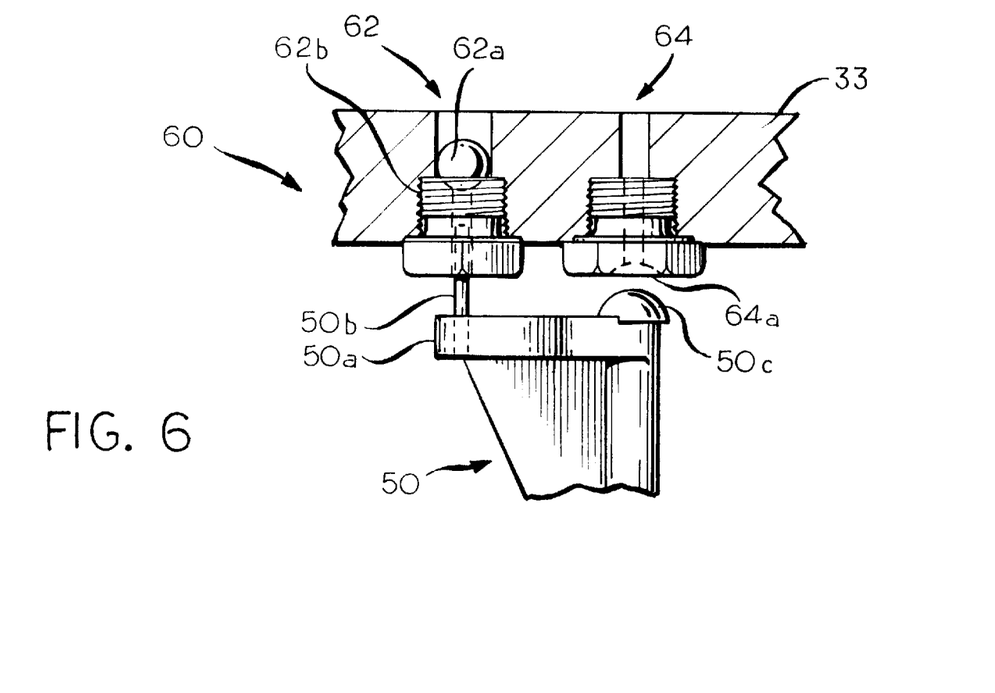
FIG. 6 is a front elevational view, partially broken away, of the double valve assembly of the invention.
Figure 7:
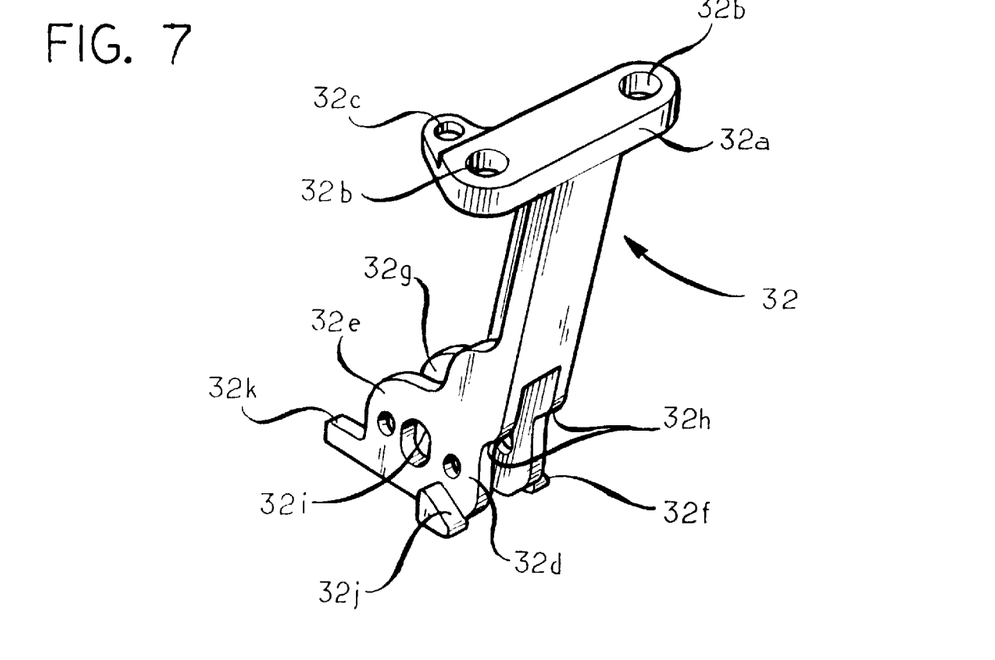
FIG. 7 is a side view of the mounting bracket of the pump trap assembly.

Referring now to FIGS. 2–7, there is illustrated a pump trap assembly, shown generally at 30, according to a first preferred embodiment of the invention. The pump trap assembly includes a mounting bracket, shown generally at 32, for mounting the pump trap assembly 30 to a sealed pressure vessel of a pump trap 33 (shown in phantom in FIG. 5). The top portion of the mounting bracket 32 includes a mounting plate 32a with a pair of apertures 32b for mounting the pump trap assembly 30 to the pressure vessel of the pump trap 33 using means well known in the art. The mounting plate 32a also includes a outwardly extending portion 32c. A guide pin 34 passes through an aperture in the outwardly extending portion 32c. The guide pin 34 has an outer diameter slightly smaller than the diameter of the aperture in the outwardly extending portion 32c. The guide pin 34 may include a collar 34a to prevent unwanted downward movement of the guide pin 34 in the vertical direction. As best seen in FIG. 3, the outwardly extending portion 32c is slightly vertically lower in elevation than the mounting plate 32a such that the collar 34a is substantially flush with the mounting plate 32a. In this manner, the pressure vessel of the pump trap 33 may prevent unwanted upward movement of the guide pin 34 in the vertical direction. The purpose of the guide pin 34 will be discussed below. As best seen in FIG. 7, the lower portion of the mounting bracket 32 includes a pair of substantially parallel, downwardly extending front and rear arms 32d, 32e, 32f, 32g and a generally non-circular aperture therebetween having an inner surface 32i. The purpose of the front and rear arms 32d, 32e, 32f, 32g will be discussed below.

Figure 4:
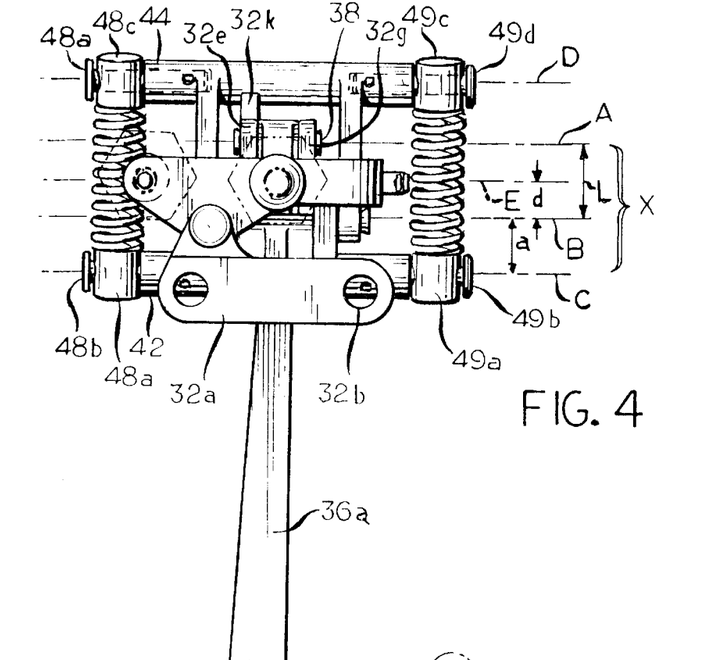
FIG. 4 is a top view of the pump trap assembly of FIG. 2.
Figure 5:
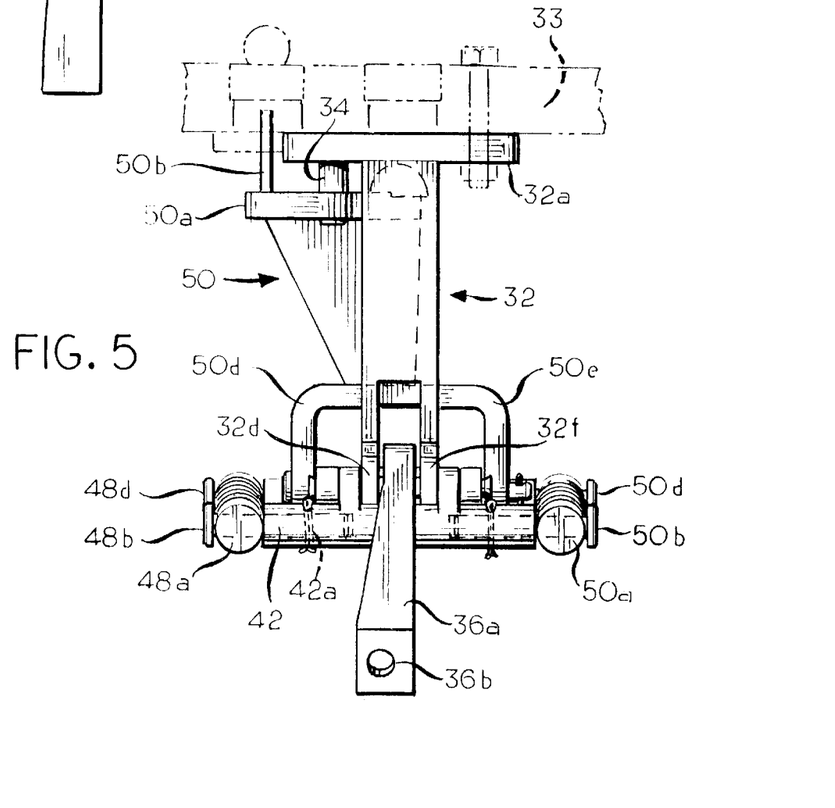
FIG. 5 is a front elevational view of the pump trap assembly of FIG. 2.

The pump trap assembly 30 also includes a float 36 (shown in phantom in FIG. 2) that may be connected to a float arm 36a by inserting a threaded fastener (not shown) through an opening 36b located at the front of the float arm 36a. As best seen in FIG. 4, a pivot pin 38 passes through apertures in the rear of the float arm 36a and the arms 32e, 32g located at the rear of the mounting bracket 32 to pivotally mount the float arm 36a, along with float 36 attached to the float arm 36a about a pivot axis, A.

The pump trap assembly 30 also includes a linkage mechanism or spring assembly, shown generally at 40. The spring assembly 40 includes a pair of substantially cylindrical spring arms 42, 44. The spring arm 42 passes through the aperture 36c formed through the float arm 36a for engagement therewith. The spring arm 42 also includes a pair of outwardly extending arms 42b. The arms 42b are substantially parallel and spaced a predetermined distance from each other. The spring arm 44 is substantially identical to the spring arm 42, except that the predetermined distance between the arms 44b is larger than the predetermined distance between the arms 42b such that the arms 44b lie outside the arms 42b. However, it should be realized that the invention can be practiced by placing the arms 44b inside the arms 42b. A pivot pin 46 passes through apertures on the arms 42b, 44b to pivotally mount the spring arms 42, 44 about a pivot axis, B. The pivot pin 46 also passes through apertures on the arms 32d, 32f of the mounting bracket 32 to pivotally mount the spring arms 42, 44 to the front of the mounting bracket 32 about the pivot axis, B. Preferably, the distance, L, between the pivot axis, A, for the pivot pin 38 and the pivot axis, B, for the pivot pin 46 is approximately 0.70 inches.

The spring assembly 40 also includes a pair of coil springs 48, 49. One end of the spring 48 may be provided with an end cap 48a having a transverse internal bore extending therethrough having a diameter slightly larger than the diameter of a pivot pin 48b to pivotally mount the coil spring 48 about a pivot axis, C. Similarly, the other end of the spring 48 may be provided with an end cap 48c having a transverse internal bore therethrough having a diameter slightly larger than the diameter of a pivot pin 48d to pivotally mount the coil spring 48 about a pivot axis, D. Likewise, one end of the spring 49 may be provided with an end cap 49a having a transverse internal bore extending therethrough having a diameter slightly larger than the diameter of a pivot pin 49b to pivotally mount the coil spring 49 about the pivot axis, C. Similarly, the other end of the spring 49 may be provided with an end cap 49c having a transverse internal bore therethrough having a diameter slightly larger than the diameter of a pivot pin 49d to pivotally mount the coil spring 49 about the pivot axis, D. The distance, a, between the pivot axis, B, (for the pivot pin 46) and the pivot axis, C, (for the pivot pins 48b, 49b for spring arm 42) is approximately 0.62 inches. The pivot pins 48b, 48d, 49b, 49d may be attached to the spring arms 42, 44 by positioning cotter pins 42a, 44a in apertures formed in the spring arms 42, 44.

The pump trap assembly 30 includes an actuator, shown generally at 50. The upper portion of the actuator 50 includes a plate member 50a with an aperture for receiving the guide pin 34 such that the actuator 50 is mounted for reciprocation along a substantially vertical axis. The plate member 50a of the actuator 50 also includes a push rod 50b and a valve 50c. The purpose of the push rod 50b and valve 50c will be described below. The lower portion of the actuator 50 is generally U-shaped including a pair of downwardly extending yoke arms 50d, 50e. A pivot pin 52 passing through an aperture in each yoke arm 50d, 50e, through the U-shaped lower portion of the mounting bracket 32, and through apertures in the pair of arms 44b pivotally mounts the actuator 50 about a pivot axis, E.

As best seen in FIG. 6, the push rod 50b and the valve 50c of the actuator 50 cooperate with a valve mechanism, shown generally at 60. The valve mechanism 60 includes a gas (steam) inlet valve 62 and a gas exhaust or vent valve 64. When the float 36 is at its lowest position, as shown in FIG. 2, the inlet valve 62 is closed and the vent valve 64 is open, as shown in FIG. 6. As the float 36 rises due to the liquid level rising in the pressure vessel of the pump trap 33, the float 36 rotates about the pivot axis, A, and engages the spring arm 42. As the float 36 and float arm 36a continue to rise, the spring arm 42 also rises, increasing the tension of the coil springs 48, 49.

Referring now to FIG. 3, when the float 36 (with the float arm 36a attached thereto) reach the upper tripping point, the energy stored in the coil springs 48, 49 causes both spring arms 42, 44 to snap upwards. The upper tripping point is defined as a line passing through pivot axes, B, C and D, when the pivot axis, C, moves to a point that is approximately co-linear with the pivot axes, B and D. Preferably, the upper tripping point has a upward angle (when viewing from left to right in FIG. 3) of approximately five (5) degrees with respect to a horizontal axis, H.

As best shown in FIG. 2, when the spring arms 42, 44 snap upwards over the upper tripping point, they move into oppositely upward oblique positions (shown in phantom in FIG. 3) such that arms 44b rotate about the pivot axis, B, and arms 42b also rotate about the same pivot axis, B. The rotation of the arms 44b causes the actuator 50 to simultaneously move upward along the vertical axis of the guide pin 34. This upward movement of the actuator 50 causes the push rod 50b and the valve 50c, operatively coupled thereto, to move also simultaneously in the vertical direction. This movement causes the push rod 50b to drive a valve 62a off a valve seat 62b, and the valve 50c to be driven upward into sealing engagement with a valve seat 64a of the vent valve 64 to simultaneously open the inlet valve 62 and close the vent valve 64.

In the preferred embodiment, the valve 50c and the valve seat 64a are semi-spherical in shape. However, it should be realized that the invention is not limited to the complementary shape of the valve 50c and the valve seat 64a and that the invention can be practiced with any complementary shape for the valve 50c and the valve seat 64a. It should also be realized that the distance, d, between the pivot axis, B, and the pivot axis, E, may readily be varied to vary the amount of upward travel of the actuator 50 depending on the length of the stroke desired for the push rod 50b and valve 50c. Also, it should be noted that in order for the springs 48, 49 of the spring assembly 30 to exert a sufficient amount of force to maintain the inlet valve 62 in the open position and the vent valve 64 in the closed position, the pivot pin 52 should not engage an inner surface 32i of the mounting bracket 32 when the spring arms 42, 44 are in the up position.

As best seen in FIGS. 3 and 7, when the spring arms 42, 44 snap upwards over the upper tripping point, the spring arm 42 engages an angled surface 32h of the mounting bracket 32 to act as a stop, and thereby prevent excessive rotation of the spring arm 42. In addition, the valve 50c engages the valve seat 64a to act as a stop, and thereby prevent excessive rotation of the spring arm 44. Preferably, the spring arm 42 has an upward angle of approximately thirty (30) degrees and the spring arm 44 has an upward angle of approximately fifteen (15) degrees with respect to the horizontal axis, H, when they are in the up position.

As the liquid level in the pressure vessel (not shown) decreases, the float 36 drops. Before the float 36 reaches its lowest position, the float arm 36a engages the spring arm 42. As the float 36 and float arm 36a continues to fall, the spring arm 42 also falls, increasing the tension of the coil springs 48, 49. When the float 36 reaches a lower tripping point, the energy stored in the coil springs 48, 49 causes both spring arms 42, 44 to snap downwards. Similar to the upper tripping point, the lower tripping point is defined as a line passing through pivot axes, B, C and D, when the pivot axis, C, moves to a point that is approximately co-linear with the pivot axes, B and D. During the downstroke of the spring arm 42, the lower tripping point has a downward angle (when viewing from left to right in FIG. 3) of approximately fifteen (15) degrees with respect to the horizontal axis, H.

As best seen in FIGS. 3 and 7, when the spring arms 42, 44 snap downwards over the lower tripping point, the spring arm 42 engages an angled surface 32j of the mounting bracket 32 to act as a stop, and thereby prevent excessive rotation of the spring arm 42. In addition, the spring arm 44 engages the outer surface 32k of the mounting bracket 32 to act as a stop, and thereby prevent excessive rotation of the spring arm 44. Preferably, the spring arm 42 has a downward angle of approximately thirty-five (35) degrees and the spring arm 44 has a downward angle of approximately five (5) degrees with respect to the horizontal axis, H, when they are in the down position.

Figure 8:
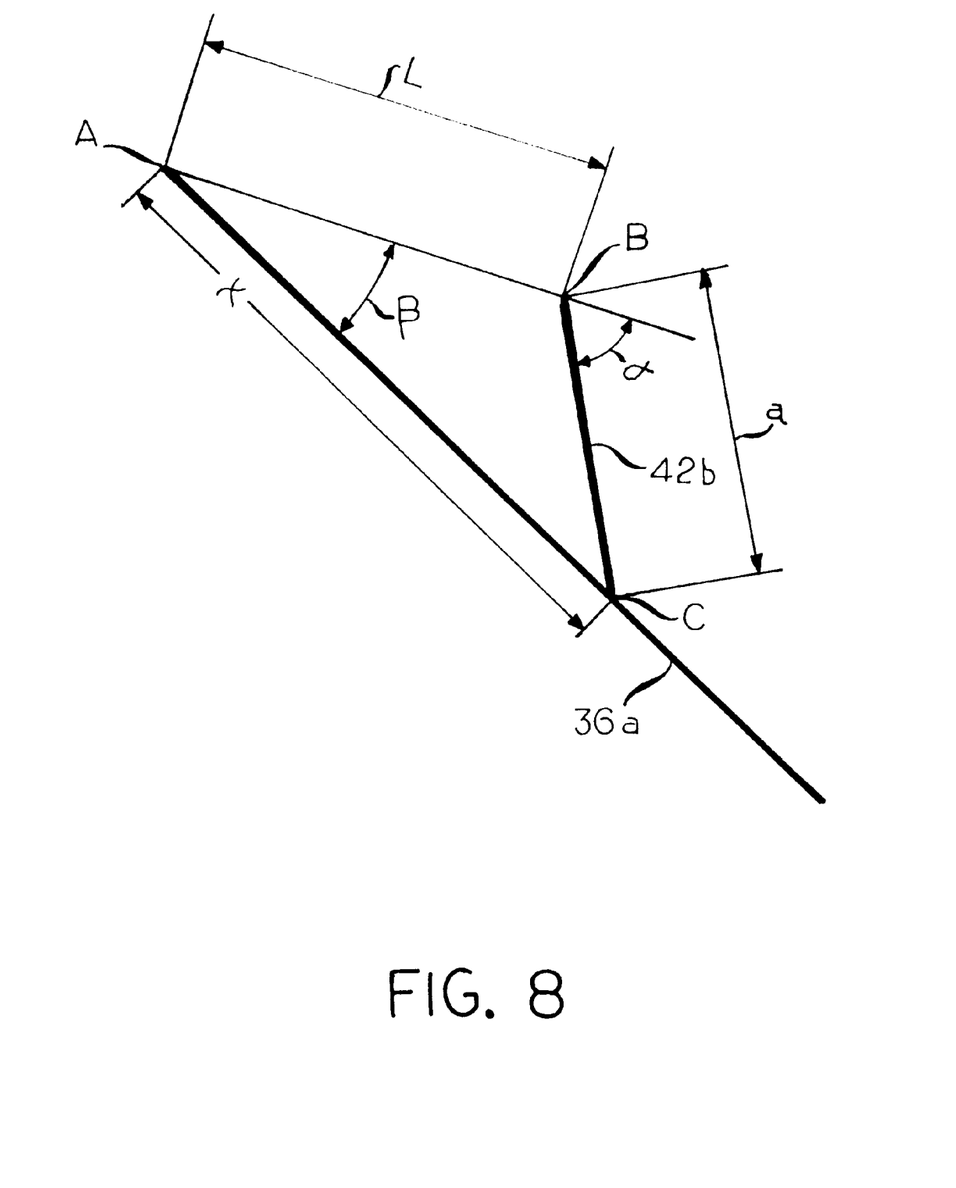
FIG. 8 is a diagram showing the relationship between the angular motion of the float arm as a function of the angular motion of the spring arm.

An important aspect of the invention is providing a pump trap assembly 30 that includes a plurality of pivot axes for decreasing the travel distance necessary for the float arm 36a to cause the spring assembly 40 to snap through the upper and lower tripping points when compared to conventional pump trap assemblies. FIG. 8 shows a diagram of the relationship between the change of the angle, $\Delta\alpha$, of the arm 42b of the spring arm 42 and the change in the angular motion in degrees, $\Delta\beta$, of the float arm 36a. This relationship can be expressed by the following equations:

$$x_{\Delta\alpha} = \sqrt{(L^2 + a^2) - 2 \cdot L \cdot a \cdot \cos((180 - \alpha + \Delta\alpha) \cdot \deg)} \quad (1)$$

-continued $$\beta_{\Delta\alpha} = \frac{a\sin\left[\frac{a}{x_{\Delta\alpha}}\sin((180-\alpha+\Delta\alpha)\cdot deg\right]}{deg}, \quad (2)$$

where
- L=the distance between the float arm pivot axis, A, and the spring arm pivot axis, B, =0.70 inches,
- a=the length of the arm 42b of the spring arm 42 =0.62 inches, and
- Δα=the change of the angle, degrees, of the arm 42b of the spring arm 42.

Figure 9:
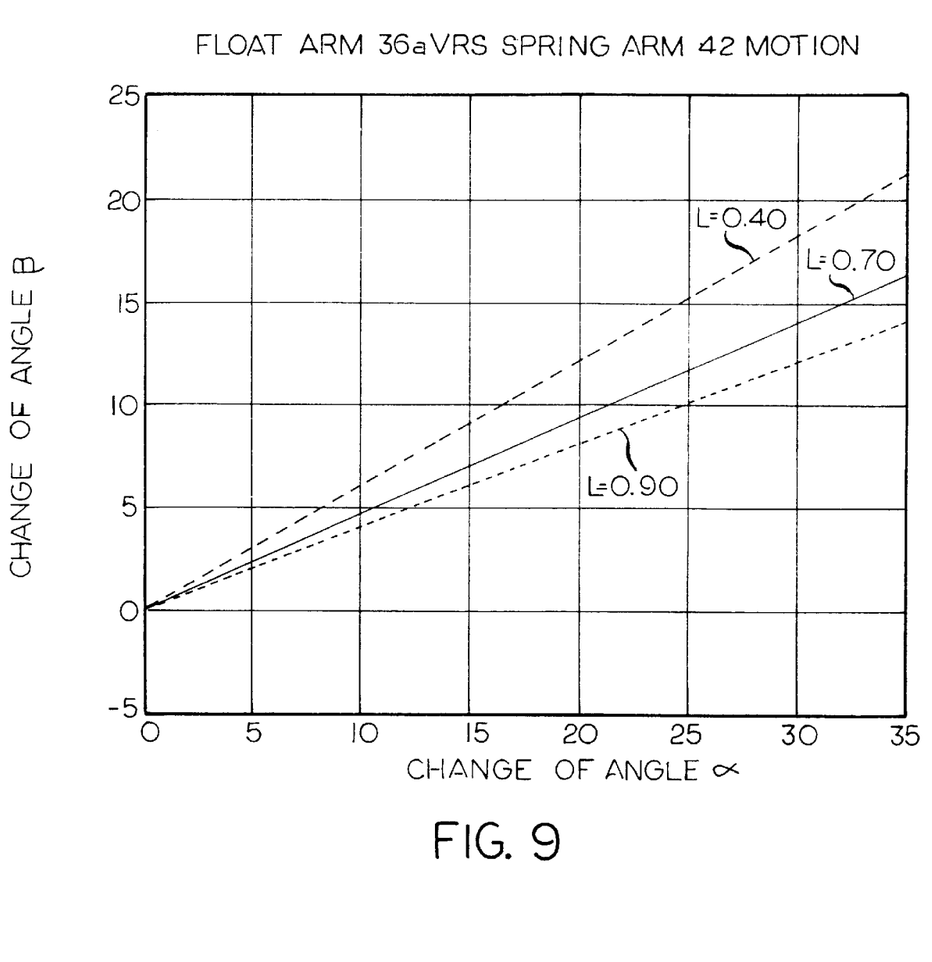
FIG. 9 is a graph showing the change of angle of the float arm as a function of the change of angle of the spring arm for a given distance between the float arm and the spring arm pivot axes and the length of the spring arm from the spring arm pivot axis.

From Equations (1) and (2), the change of the angle, Δα, of the arm 42b of the spring arm 42 can be determined as a function of the change of the angle, Δβ, of the float arm 36a. FIG. 9 shows a graph of the change of the angle, Δβ, as a function of the change of the angle, Δα. In the preferred embodiment, the distance, L, is approximately equal to 0.70 inches, and a length, a, is approximately equal to 0.62 inches. As seen in FIG. 9, the change of the angle, Δβ, of the float arm 36a is approximately one-half of the change of the angle, Δα, of the spring arm 42. However, it should be readily apparent that by varying the distance, L, between the float arm 36a pivot axis, A, and the spring arm 42 pivot axis, B, that the change of the angle, Δβ, of the float arm 36a will also vary as a function of the change of the angle, Δα, of the spring arm 42. Specifically, increasing the distance, L, for example, to approximately 0.90 inches, while the distance, a, remains constant will cause a decrease in the change of the angle, Δβ, of the float arm 36a as a function of the change of the angle, Δα, of the spring arm 42. On the other hand, by decreasing the distance, L, for example, to approximately 0.40 inches, while the distance, a, remains constant will cause an increase in the change of the angle, Δβ, of the float arm 36a as a function of the change of the angle, Δα, of the spring arm 42. This variation of the change of the angle of the float arm 36a, β, with respect to the change of the angle, Δα, of the spring arm 42 is an important feature of the invention and allows the pump trap assembly 30 to be positioned in locations with very little available height, unlike conventional pump trap assemblies.

In the first preferred embodiment of the invention, the pump trap assembly 30 included the float arm 36a rotatable about a float arm pivot axis, A, and a pair of spring arms 42, 44 rotatable about a spring arm pivot axis, B. In particular, the float arm pivot axis, A, is positioned behind the spring arm pivot axis, B, i.e, toward the rear of the pump trap assembly 30. However, the invention is not limited by this configuration for the float arm and spring arm pivot axes, and that many different variations of the locations and combinations of the float arm/spring arm pivot axes are possible.

Figure 10:
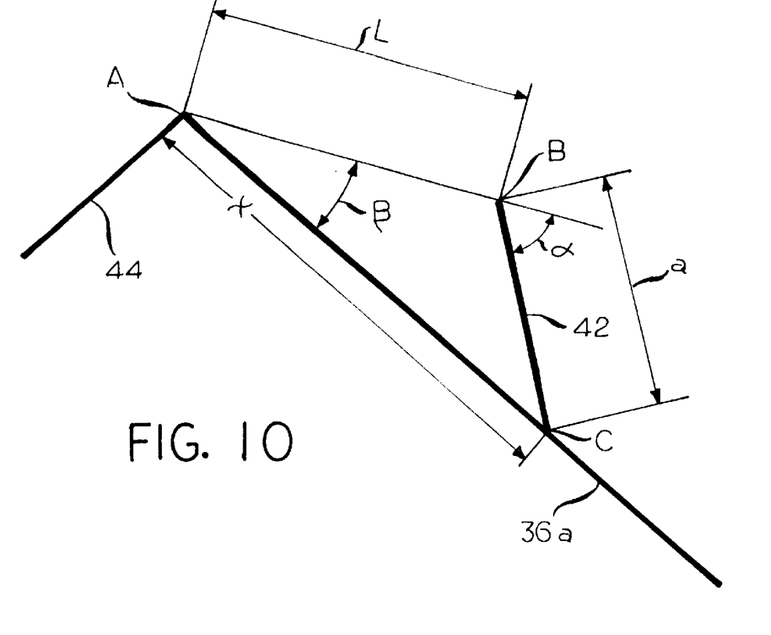
FIG. 10 is a diagram showing a second preferred embodiment of the invention.

FIG. 10 shows a diagram of a second preferred embodiment of the invention. In the second preferred embodiment, the float arm 36a and the spring arm 44 may rotate about the same pivot axis, A, and the spring arm 42 may rotate about a different pivot axis, B, as shown in FIG. 10. The pivot axis, A, may be positioned behind the pivot axis, B, i.e., toward the rear of the pump trap assembly. However, it should be appreciated that the second embodiment of the invention can be practiced with the pivot axis, A and B, at any location with respect to each other.

Figure 11:
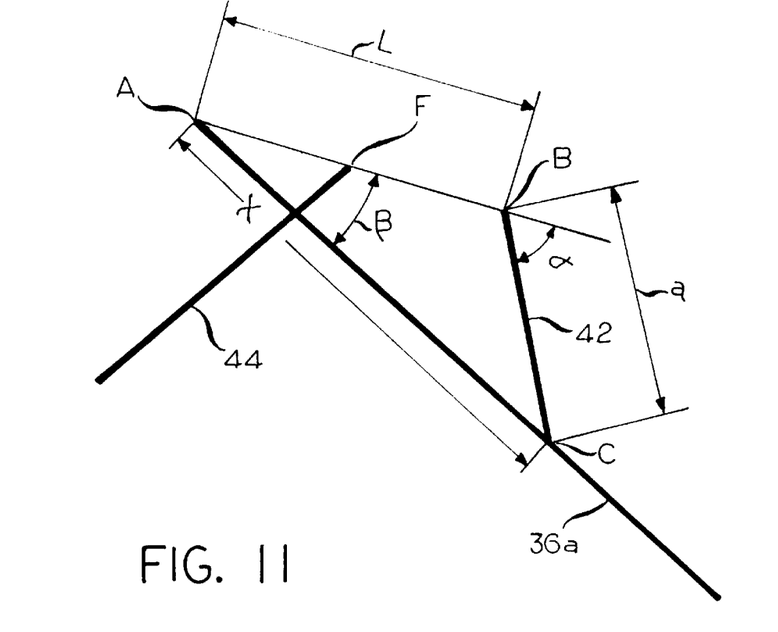
FIG. 11 is a diagram showing a third preferred embodiment of the invention.

FIG. 11 shows a diagram of a third preferred embodiment of the invention. In the third preferred embodiment, the float arm 36a may rotate about a first pivot axis, A, the spring arm 42 may rotate about a second pivot axis, B, and the spring arm 44 may rotate about a third pivot axis, F. Preferably, the float arm 36a pivot axis, A, may be positioned behind the spring arm 44 pivot axis, F, and the spring arm 42 pivot axis, B, respectively. However, it should be appreciated that the third embodiment of the invention can be practiced with the pivot axis, A, B and F, at any location with respect to each other.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A pump trap assembly having multiple pivot axes, comprising:
   a mounting bracket for mounting said trap assembly to a structure;
   a first pivot arm pivotally mounted to said mounting bracket about a first pivot axis;
   a second pivot arm pivotally mounted to said mounting bracket about the first pivot axis;
   a spring connected to said first and second pivot arms for biasing said first and second pivot arms toward each other;
   a float arm pivotally mounted to said mounting bracket about a second pivot axis, said second pivot axis being disposed a distance from the first pivot axis; and
   an actuator pivotally mounted to said second pivot arm about a third pivot axis, the third pivot axis being disposed a distance from the first pivot axis,
   wherein said float arm includes an aperture, said first pivot and third pivot axes passing through said aperture, and
   wherein movement of said float arm from a first position to a second position causes said first pivot arm to move in a first direction, and
   wherein movement of said first pivot arm in the first direction a first predetermined distance causes said spring to urge said second pivot arm in the first direction, thereby causing said actuator to move in the first direction.

2. The assembly according to claim 1, wherein movement of said float arm from the first position to the second position causing said first pivot arm to move in the first direction the first predetermined distance is a function of the distance between the first pivot axis and the second pivot axis.

3. The assembly according to claim 1, wherein a distance that the actuator moves in the first direction is a function of the distance between the first pivot axis and the third pivot axis.

4. The assembly according to claim 1, wherein said actuator includes a valve for cooperating with a valve seat of a valve mechanism.

5. The assembly according to claim 4, wherein said valve and said valve seat act as a stop for preventing excessive movement of said second pivot arm in the first direction.

6. The assembly according to claim 1, wherein said actuator includes a push rod for cooperating with a valve of a valve mechanism.

7. The assembly according to claim 1, wherein movement of said float arm from a third position to a fourth position causes said first pivot arm to move in a second direction, and wherein movement of said first pivot arm in the second direction a second predetermined distance causes said spring to urge said second pivot arm in the second direction, thereby causing said actuator to move in the second direction.

8. The assembly according to claim 7, further comprising a guide pin for guiding said actuator in one of the first and second directions.

9. The assembly according to claim 7, wherein said mounting bracket acts as a stop for preventing excessive movement of one of said first and second pivot arms in one of the first and second directions.

10. A pump trap assembly, comprising:
a mounting bracket for mounting said pump trap assembly to a structure;
a first pivot arm pivotally mounted to said mounting bracket for pivotal movement about a first pivot axis;
a second pivot arm pivotally mounted to said mounting bracket for pivotal movement about a second pivot axis;
means for urging said first and second pivot arms toward each other;
a float arm for pivotal movement about a third pivot axis, said float arm including a aperture, said first, second and third axes passing through said aperture; and
an actuator pivotally mounted to said second pivot arm,
wherein movement of said first pivot arm a predetermined distance in a first direction causes said second pivot arm to move in the first direction, thereby causing said actuator to move in the first direction.

11. The pump trap assembly according to claim 10, wherein the first pivot axis is identical to the second pivot axis.

12. The pump trap assembly according to claim 11, wherein said float arm includes a float, and wherein the first and second pivot axes are positioned closer to said float than the third pivot axis.

13. The pump trap assembly according to claim 10, wherein the second pivot axis is identical to the third pivot axis.

14. The pump trap assembly according to claim 13, wherein said float arm includes a float, and wherein the first pivot axis is positioned closer to said float than the second and third pivot axes.

15. The pump trap assembly according to claim 10, wherein the first pivot axis is identical to the third pivot axis.

16. The pump trap assembly according to claim 15, wherein said float arm includes a float, and wherein the first and third pivot axes are positioned closer to said float than the second pivot axis.

17. The pump trap assembly according to claim 10, wherein said actuator includes a valve for cooperating with a valve seat of a valve mechanism.

18. The pump trap assembly according to claim 17, wherein said valve and said valve seat act as a stop for preventing excessive movement of said second pivot arm in the first direction.

19. The pump trap assembly according to claim 10, wherein said actuator includes a push rod for cooperating with a valve of a valve mechanism.

20. The pump trap assembly according to claim 10, wherein movement of said float arm from a third position to a fourth position causes said first pivot arm to move in a second direction, and wherein movement of said first pivot arm in the second direction a second predetermined distance causes said spring to urge said second pivot arm in the second direction, thereby causing said actuator to move in the second direction.

21. The pump trap assembly according to claim 20, further comprising a guide pin for guiding said actuator in one of the first and second directions.

22. The pump trap assembly according to claim 20, wherein said mounting bracket acts as a stop for preventing excessive movement of one of said first and second pivot arms in one of the first and second directions.

23. A pump trap, comprising:
a sealed pressure vessel; and
a pump trap assembly, comprising:
a mounting bracket for mounting said pump trap assembly to said sealed pressure vessel;
a first pivot arm pivotally mounted to said mounting bracket about a first pivot axis;
a second pivot arm pivotally mounted to said mounting bracket about the first pivot axis;
a spring connected to said first and second pivot arms for biasing said first and second pivot arms toward each other;
a float arm pivotally mounted to said mounting bracket about a second pivot axis, said second pivot axis being disposed a distance from the first pivot axis; and
an actuator pivotally mounted to said second pivot arm about a third pivot axis, the third pivot axis being disposed a distance from the first pivot axis,
wherein said float arm includes an aperture, said first pivot and second pivot axes passing through said aperture.

24. A pump trap assembly, comprising:
a mounting bracket for mounting said pump trap assembly to a structure;
a first pivot arm pivotally mounted to said mounting bracket about a first pivot axis;
a second pivot arm pivotally mounted to said mounting bracket about the first pivot axis;
means for urging said first and second pivot arms;
a float arm for pivotal movement about a second axis, said float arm including a aperture for engaging one of said first and second pivot arms passing through said aperture; and
an actuator pivotally mounted to said second pivot arm,
wherein movement of said float arm in a first direction causes said float arm to engage and move said first pivot arm in the first direction and to cause said urging means to urge said second pivot arm in the first direction, thereby causing said actuator to move in the first direction.

25. The pump trap assembly according to claim 24, wherein said float arm includes a float, and wherein the first pivot axis is positioned closer to said float than the second pivot axis.

26. The pump trap assembly according to claim 24, wherein said actuator includes a valve for cooperating with a valve seat of a valve mechanism.

27. The pump trap assembly according to claim 26, wherein said valve and said valve seat act as a stop for preventing excessive movement of said second pivot arm in the first direction.

28. The pump trap assembly according to claim 24, wherein said actuator includes a push rod for cooperating with a valve of a valve mechanism.

29. The pump trap assembly according to claim 24, wherein of said float arm in a second direction causes said float art to engage and move said first pivot arm in the second direction and to cause said urging means to urge said second pivot arm in the second direction, thereby causing said actuator to move in the second direction.

30. The pump trap assembly according to claim 29, further comprising a guide pin for guiding said actuator in one of the first and second directions.

31. The pump trap assembly according to claim 29, wherein said mounting bracket acts as a stop for preventing excessive movement of one of said first and second pivot arms in one of the first and second directions.

* * * * *